United States Patent
Zheng et al.

(10) Patent No.: US 9,973,422 B2
(45) Date of Patent: May 15, 2018

(54) TRAFFIC INTERCONNECTION BETWEEN VIRTUAL DEVICES

(71) Applicant: Hangzhou H3C Technologies Co., Ltd., Hangzhou (CN)

(72) Inventors: Guoliang Zheng, Beijing (CN); Shufa Guan, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 253 days.

(21) Appl. No.: 14/405,378

(22) PCT Filed: Oct. 9, 2013

(86) PCT No.: PCT/CN2013/084874
§ 371 (c)(1),
(2) Date: Dec. 3, 2014

(87) PCT Pub. No.: WO2014/063567
PCT Pub. Date: May 1, 2014

(65) Prior Publication Data
US 2015/0334011 A1  Nov. 19, 2015

(30) Foreign Application Priority Data
Oct. 26, 2012  (CN) .......................... 2012 1 0419267

(51) Int. Cl.
*H04L 12/741* (2013.01)
*H04L 12/931* (2013.01)
*H04L 12/935* (2013.01)

(52) U.S. Cl.
CPC .......... *H04L 45/54* (2013.01); *H04L 49/3009* (2013.01); *H04L 49/70* (2013.01)

(58) Field of Classification Search
CPC ...... H04L 49/70; H04L 45/54; H04L 49/3009
See application file for complete search history.

(56) References Cited

U.S. PATENT DOCUMENTS

| | | | |
|---|---|---|---|
| 6,240,078 B1 * | 5/2001 | Kuhnel | H04L 49/105 370/331 |
| 7,797,460 B2 | 9/2010 | Kinsey et al. | |
| 7,925,802 B2 | 4/2011 | Lauterbach et al. | |

(Continued)

FOREIGN PATENT DOCUMENTS

| | | |
|---|---|---|
| CA | 2797278 A1 | 11/2011 |
| CN | 102143068 A | 8/2011 |

(Continued)

OTHER PUBLICATIONS

International Search Report and Written Opinion dated Jan. 23, 2014 issued on PCT Patent Application No. PCT/CN2013/084874 dated Oct. 9, 2013, the State Intellectual Property Office, P.R. China.

(Continued)

*Primary Examiner* — Gbemileke J Onamuti
(74) *Attorney, Agent, or Firm* — DEQI Intellectual Property Law Corporation

(57) ABSTRACT

According to an example, a virtual port is configured for a current virtual device (VD) to interconnect the current VD with other VDs. The virtual port may be a layer 3 port and route learning and advertising of port information may be performed through the virtual port.

20 Claims, 3 Drawing Sheets

(56) References Cited

U.S. PATENT DOCUMENTS

| | | | |
|---|---|---|---|
| 9,036,636 B1* | 5/2015 | Sherwood | H04L 45/04 370/392 |
| 2009/0015446 A1 | 6/2009 | Kitani Makoto et al. | |
| 2010/0312913 A1* | 12/2010 | Wittenschlaeger | G06F 9/54 709/238 |
| 2011/0317703 A1 | 12/2011 | Dunbar et al. | |
| 2012/0155469 A1* | 6/2012 | Majumdar | H04L 45/26 370/392 |

FOREIGN PATENT DOCUMENTS

| | | |
|---|---|---|
| CN | 102469021 A | 5/2012 |
| CN | 102752219 | 10/2012 |

OTHER PUBLICATIONS

Extended European Search Report, EP Patent Application No. 13848210.4, dated May 23, 2016, pp. 1-10.

* cited by examiner

TRAFFIC INTERCONNECTION BETWEEN VIRTUAL DEVICES

CLAIM FOR PRIORITY

The present application is a national stage filing under 35 U.S.C 371 of PCT application number PCT/CN2013/084874, having an international filing date of Oct. 9, 2013, which claims priority to Chinese patent application number 201210419267.5 having a filing date of Oct. 26, 2012 the disclosures of which are hereby incorporated by reference in their entireties.

BACKGROUND

In a distributed switching and routing system, forwarding chips are responsible for packet forwarding processing. After a network device virtualizing technique is implemented, any number of forwarding chips may be virtualized into one or more Virtual Devices (VDs). From a user's perspective, each VD acts as an independent network switch, having its own, independent, routing process, layer-2 and layer-3 protocols, forwarding table items, and ports. Each VD is capable of adding its own users, capable of being restarted and reading its own configuration file. Resources may be allocated and managed between VDs via commands and they do not impact each other Forwarding traffic of the VDs is isolated from each other, and each user port of each VD is invisible to other VDs.

BRIEF DESCRIPTION OF THE DRAWINGS

Features of the present disclosure are illustrated by way of example(s) and not limited in the following figure(s), in which like numerals indicate like elements, in which.

DETAILED DESCRIPTION

Hereinafter, the present disclosure is described in further detail with reference to the accompanying drawings and examples.

According to an example, a virtual port for interconnection with other VDs is configured for each VD in a distributed switching and routing system, and the virtual port is configured as a layer-3 port. Then, routing information is distributed and received, and port information of the virtual port is advertised and received. When a packet is to be forwarded to a user device by another VD, the VD determines the IP address and the MAC address of the virtual port of the other VD that the user device belongs to by searching a routing table and Address Resolution Protocol (ARP) learning. Then, the VD determines a corresponding port number according to the port information of virtual ports advertised by other VDs. The VD transmits the packet to a virtual port indicated by the port number, such that the other VD that the user device belongs to receives the packet via its virtual port and forwards the packet.

Conventional systems usually connect VDs using an external line such as a fiber or a cable line. Such solution is inconvenient for users and increases networking cost of users. According to the examples described herein, traffic interconnection may be realized between VDs without using an external line such as fiber or a cable line between the VDs. Thus, the user's networking cost is reduced.

In examples of the present disclosure, the user devices connected (directly or indirectly) with user ports of the VD are referred to as user devices under the VD. The user devices under the VD belong to the VD.

A forwarding chip makes the routing or switching decisions. A VD may include a virtual switch or other virtual device. Relationships are established between the forwarding chips and the VDs (i.e., relationships indicating which forwarding chip is added to which VD). In various examples of the present disclosure, in order to realize traffic interconnection between VDs in the distributed switching and routing system, the forwarding chip is taken as a minimum unit for joining and exiting from the VD in the distributed switching and routing system.

Figure 1:
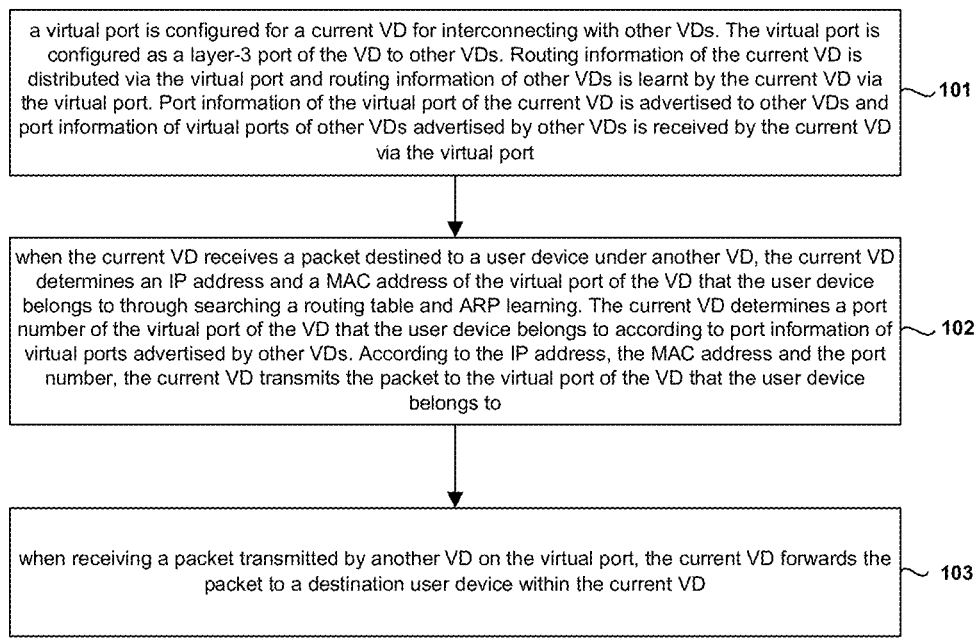
FIG. 1 is a flowchart illustrating a method for implementing traffic interconnection between VDs according to an example of the present disclosure.

FIG. 1 is a flowchart illustrating a method for implementing traffic interconnection between VDs according to an example of the present disclosure. As shown in FIG. 1, the method includes the following operations.

At block 101, a virtual port is configured for a current VD for interconnecting with other VDs. The virtual port is configured as a layer-3 port of the VD to other VDs. Routing information of the current VD is distributed via the virtual port and routing information of other VDs is learnt by the current VD via the virtual port. Port information of the virtual port of the current VD is advertised to other VDs and port information of virtual ports of other VDs advertised by other VDs is received by the current VD via the virtual port.

In order to realize the traffic interconnection between VDs, a virtual port is configured for each VD for interconnecting with other VDs. The virtual port is configured as a layer-3 port of the VD to other VDs. For any two VDs in the distributed switching and routing system, when one VD is to transmit a packet to the other VD, it transmits the packet to the virtual port of the other VD first and then the other VD receives the packet via its virtual port.

In this example, the virtual port configured for each VD is a loopback port, such that after the packet is received by the VD via the virtual port, the packet is looped back to the VD and is processed and forwarded within the VD. In a practical application, each forwarding chip in the distributed switching and routing system is usually configured with a loopback port. This loopback port may be configured as the virtual port of the VD. Alternatively, the virtual port may be configured utilizing the loopback ports of the forwarding chips of the VD.

Examples for configuring the virtual port for interconnecting with other VDs are as follows. In a first example, whether the forwarding chips in the current VD have loopback ports or not, a new loopback port is configured for the current VD and the newly-configured loopback port is taken as the virtual port of the current VD. The method for configuring a loopback port is similar to that in conventional systems.

In a second example, some or all of the forwarding chips of the current VD have loopback ports, and the loopback port of one forwarding chip is selected as the virtual port of the current VD.

In a third example, some or all of the forwarding chips of the current VD have loopback ports, and the loopback ports of the forwarding chips having loopback ports are aggregated into one aggregated port and the aggregated port is taken as the virtual port of the current VD.

After a virtual port is configured for each VD, the virtual port of each VD is configured as a layer-3 port for other VDs, so as to distribute and receive routing information via the layer-3 port. In addition, in conventional systems, since traffic of VDs is isolated, the virtual port of one VD is invisible to other VDs. In order to realize traffic interconnection according to an example, port information of the virtual port of one VD is advertised to other VDs. Thus, the virtual port of the VD becomes visible to other VDs. The port information of the virtual port includes a MAC address of the virtual port and a port number of the virtual port. The implementation of the routing information distribution and the advertising of the port information are now described.

In one example, to configure the virtual port of the current VD to be a layer-3 port for other VDs, the virtual port of the current VD is configured to be a router port through allocating an IP address for the virtual port of the current VD. In another example, the virtual port of the current VD is configured to be a switch port through adding the virtual port of the current VD into a pre-defined VLAN corresponding to the current VD and allocating for the virtual port of the current VD an IP address based on the pre-defined VLAN.

After the virtual port of the current VD is configured to be the layer-3 port for other VDs, a MAC address is configured for the virtual port of the current VD, so as to differentiate packets destined to different VDs according to MAC address.

At block 102, when the current VD receives a packet destined to a user device under another VD, the current VD determines an IP address and a MAC address of the virtual port of the VD that the user device belongs to through searching a routing table and ARP learning. The current VD determines a port number of the virtual port of the VD that the user device belongs to according to port information of virtual ports advertised by other VDs. According to the IP address, the MAC address and the port number, the current VD transmits the packet to the virtual port of the VD that the user device belongs to.

In block 101, since the current VD has received the routing information distributed by other VDs, the current VD has learnt the routing information of other VDs and generated a corresponding routing table. Therefore, when receiving the packet destined to the user device under another VD, the current VD may determine a next hop IP address of the packet through searching the routing table and may determine the MAC address corresponding to the next hop IP address through ARP learning. The detailed ARP learning process is as follows: an ARP table is searched to determine whether there is an ARP table item corresponding to the next hop IP address. If there is, the MAC address found in the ARP table item is determined to be the MAC address corresponding to the next hop IP address; otherwise, an ARP request message whose target IP address is the next hop IP address is transmitted to other VDs. If an ARP response message returned by another VD is received, a sender MAC address of the ARP response message is determined as the MAC address corresponding to the next hop IP address, and an ARP table item corresponding to the next hop IP address is created. Herein, the next hop IP address of the packet is the IP address of the virtual port of the VD that the destination user device of the packet belongs to. The MAC address corresponding to the next hop IP address of the packet is the MAC address of the virtual port of the VD that the destination user device of the packet belongs to.

Since the current VD has received the routing information advertised by other VDs in block 101, in this block, the current VD may determine, after determining the next hop IP address of the packet and the MAC address corresponding to the next hop IP address, the port number of the virtual port of the VD that the destination user device of the packet belongs to according to the MAC address corresponding to the next hop IP address and the routing information of virtual ports of other VDs. Therefore, the packet can be transmitted to the virtual port of the VD that the destination user device of the packet belongs to according to the next hop IP address, the MAC address corresponding to the next hop IP address and the port number corresponding to the MAC address. In particular, the MAC address corresponding to the next hop IP address may be encapsulated as a target MAC address of the packet. Then, the packet is transmitted to the virtual port denoted by the port number corresponding to the target MAC address.

At block 103, when receiving a packet transmitted by another VD on the virtual port, the current VD forwards the packet to a destination user device within the current VD.

When the current VD receives a packet transmitted by another VD on its virtual port, the destination user device of the packet is a user device under the current VD. Since the virtual port of the current VD is a loopback port, the packet is looped back. Therefore, the packet may be processed after being looped back, i.e., the packet is forwarded through a user port corresponding to the destination user device of the packet and finally arrives at the destination user device.

It should be noted that, in the example as shown in FIG. 1, blocks 102 and 103 have no sequential order and may be performed in a different order.

Traffic isolation may be realized between VDs of the distributed switching and routing system and in some implementations VDs may not be able to exchange information with each other. However, since all of the VDs in the distributed switching and routing system may share one CPU, the CPU shared by all of the VDs may be utilized to implement the above routing information distribution, advertising of the port information of the virtual port and transmission of the ARP request message and ARP response message in examples of the present disclosure. For simplicity, the CPU shared by all of the VDs in the distributed switching and routing system is referred to as a shared CPU hereinafter.

In view of the above, the method for distributing routing information of the current VD may include: the current VD generates utilizing the shared CPU a routing protocol packet carrying the routing information of the current VD, such that other VDs obtain the routing protocol packet and learn the routing information carried in the routing protocol packet through the shared CPU. The source IP address and the source MAC address of the routing protocol packet are respectively the IP address and the MAC address of the virtual port of the current VD. It should be noted that, in the case that the virtual port of the current VD is configured to be a switch port, the routing protocol packet may carry a pre-defined VLAN tag corresponding to the current VD or not, which is determined by configurations of the switch port. If it is required to carry the VLAN tag, the VDs in the distributed switching and routing system correspond to the same pre-defined VLAN. If it is not required to carry the VLAN tag, the VDs in the distributed switching and routing system correspond to the same pre-defined VLAN or different VLANs.

For the advertising of the port information of the virtual port, the current VD may define an information advertising packet in advance. Through the information advertising packet, the port information of the virtual port is advertised. The detailed method for advertising the port information of the virtual port to other VDs includes: generating an information advertising packet carrying the virtual port information of the current VD utilizing the shared CPU, such that other VDs obtain the information advertising packet and saving the virtual port information carried in the information advertising packet through the shared CPU. In practical, the virtual port may also be advertised through other methods, e.g., configuring the virtual port information of each VD as a global variable, or saving the virtual port information of each VD in a certain storage area, such that each VD may read the virtual port information of other VDs from this storage area.

In the example shown in FIG. 1, the ARP learning is implemented using the CPU shared by all of the VDs in the distributed switching and routing system. For the ARP request message, the method for transmitting the ARP request message by the current VD to other VDs is as follows: the shared CPU, acting as the CPU of the current VD, generates the ARP request message, such that the shared CPU may act as the CPU of any other VD to obtain the ARP request message and generating an ARP response message if the target IP address of the ARP request message is the IP address of this other VD, wherein the sender IP address and the sender MAC address of the ARP response message are respectively the IP address and MAC address of the virtual port of this other VD.

The current VD may also receive an ARP request message transmitted by another VD. After receiving the ARP request message transmitted by another VD, if it is determined that the target IP address of the ARP request message is the IP address of the virtual port of the current VD, an ARP response message is generated, wherein the sender IP address and the sender MAC address of the ARP response message are respectively the IP address and MAC address of the virtual port of the current VD. Thus, the shared CPU, acting as the CPU of the VD generating the ARP request, may obtain the ARP response message generated by the current VD. It can be determined that the target IP address of the ARP request message is the IP address of the virtual port of the current VD. And then it is determined that the MAC address corresponding to the target IP address of the ARP request message is the MAC address of the virtual port of the current VD.

Figure 2:
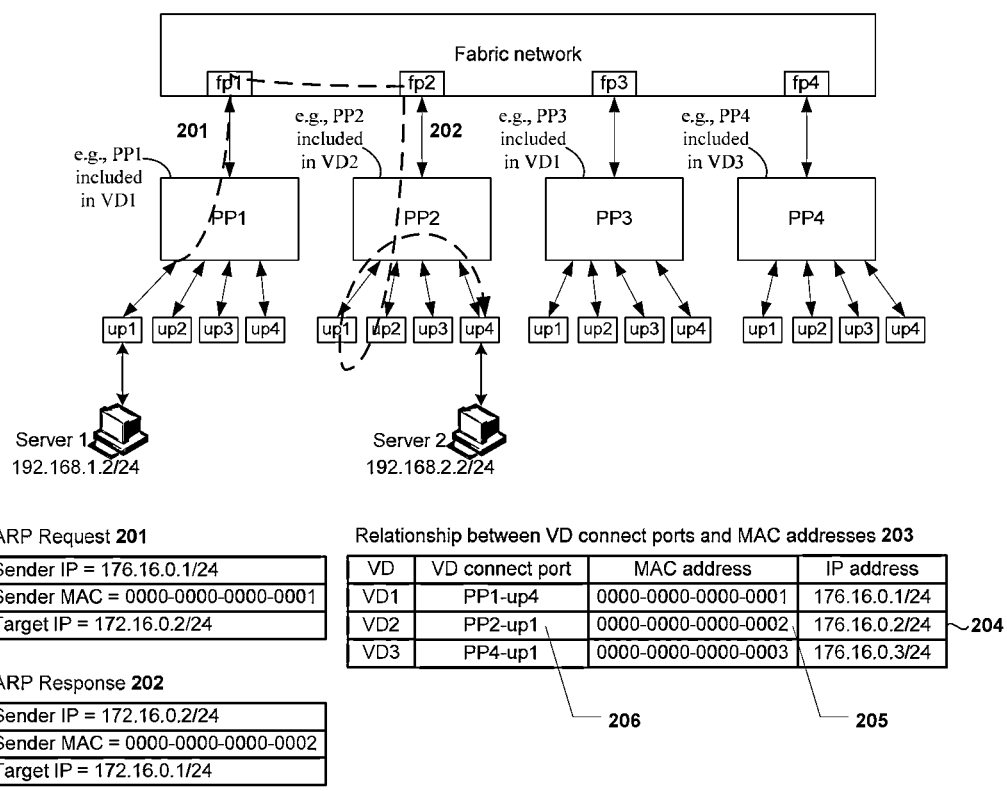
FIG. 2 is a schematic diagram illustrating a packet forwarding path between VDs according to an example of the present disclosure.

FIG. 2 is a schematic diagram illustrating a packet forwarding path between VDs according to an example of the present disclosure. As shown in FIG. 2, PP1, PP2, PP3 and PP4 are four forwarding chips in the distributed switching and routing system. Each forwarding chip has a corresponding fabric port "fp" and a plurality of user ports "up", wherein the fabric ports corresponding to PP1, PP2, PP3 and PP4 are respectively fp1, fp2, fp3 and fp4. Each forwarding chip has four user ports, denoted by up1, up2, up3 and up4. Although the same labels, up1-up4, are used for each forwarding chip, each set of "up" ports, up1-up4, is for the respective forwarding chip. Suppose that PP1 and PP3 are added to VD1, PP2 is added to VD2, PP4 is added to VD3. The user port up1 under PP1 connects with server 1 (IP address is 192.168.1.2/24). The user port up4 under PP2 connects with server 2 (IP address is 192.168.2.2/24). The loopback port of VD1 is PP1-up4 (IP address is 172.16.0.1/24, the MAC address is 0000-0000-0000-0001). The loopback port of VD2 is PP2-up1 (IP address is 172.16.0.2/24, the MAC address is 0000-0000-0000-0002). The loopback port of VD3 is PP4-up1 (IP address is 172.16.0.3/24, the MAC address is 0000-0000-0000-0003), as shown in the corresponding relationship 203 between VDs and MAC addresses in FIG. 2.

Assume server 1 is ready to transmit a packet to server 2. The packet forwarding procedure is as follows. VD1 receives on PP1-up1 a packet from server 1 (server 1 is a user device under VD1). The target IP address of the packet is 192.168.2.2/24. VD1 searches a routing table obtained by route learning and determines that the next hop IP address is 172.16.0.2/24. VD1 searches for an ARP table item corresponding to 172.16.0.2/24. If it is not found, VD1 transmits an ARP request message (see 201 in FIG. 2) with a target IP address of 172.16.0.2/24 to VD2 and VD3. After receiving the ARP request message, VD2 returns an ARP response message (see 202 in FIG. 2) with a sender IP address of 172.16.0.2/24 and a sender MAC address of 0000-0000-0000-0002. After receiving the ARP response message (see 202 in FIG. 2) returned by VD2, VD1 changes the target MAC address of the packet received from server 1 to 0000-0000-0000-0002, and changes the sender MAC address of the packet to the MAC address of the loopback port of VD1. After determining that the MAC address corresponding to 172.16.0.2/24 (see 204 in FIG. 2) is 0000-0000-0000-0002 (see 205 in FIG. 2), VD1 determines that the target port is PP2-up1 (see 206 in FIG. 2). Forwarding chip PP1 can directly transmit the packet to PP2-up1. Since PP2-up1 is a loopback port, the packet will be looped back to PP2 after arriving at PP2-up1. Thereafter, VD2 determines that the packet should be transmitted to PP2-up4 through searching the routing table obtained by route learning.

Now, the cross-VD routing forwarding of the packet is finished. The packet forwarding path between the VDs is as shown by dotted lined in FIG. 2.

The above describes the method for implementing traffic interconnection between VDs. An example of the present disclosure further provides an apparatus for implementing traffic interconnection between VDs. The apparatus is described with reference to FIG. 3.

Figure 3:
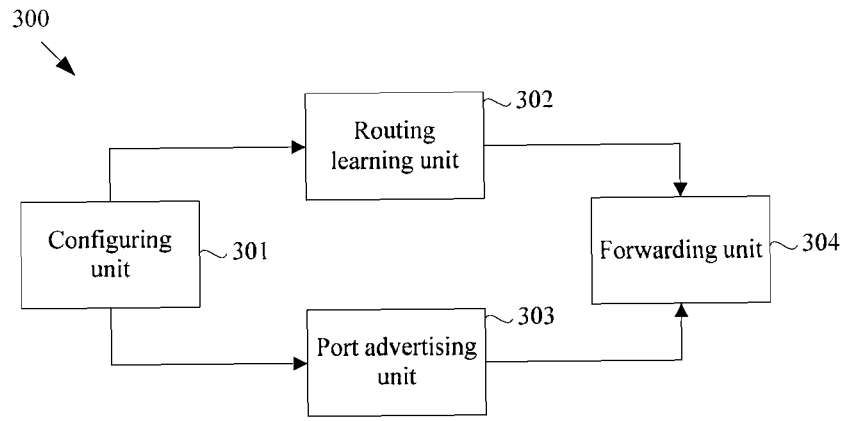
FIG. 3 is a schematic diagram illustrating a structure of a VD according to an example of the present disclosure.

FIG. 3 is a schematic diagram illustrating a structure of a VD 300 according to an example of the present disclosure. The VD 300 may be applied in a distributed switching and routing system which includes a plurality of forwarding chips and a fabric network such as shown in FIG. 2. The forwarding chip is a minimum unit for joining and exiting from the VD in the distributed switching and routing system. Relationships (i.e., relationships indicating which forwarding chip is added to which VD) are established between the forwarding chips and the VDs. The VD 300 includes a configuring unit 301, a routing learning unit 302, a port advertising unit 303 and a forwarding unit 304.

The configuring unit 301 configures for a current VD a virtual port for interconnecting with other VDs, and configures the virtual port to be a layer-3 port to other VDs.

The routing learning unit 302 distributes routing information of the current VD and learn routing information distributed by other VDs via the virtual port after the configuring unit 301 configures the virtual port of the current VD to be the layer-3 port to the other VDs.

The port advertising unit 303 advertises port information of the virtual port of the current VD to the other VDs and receive port information of virtual ports of other VDs advertised by the other VDs after the configuring unit 301 configures the virtual port of the current VD to be the layer-3 port to the other VDs.

The forwarding unit 304 determines, after a packet destined to a user device under another VD is received, an IP address and a MAC address of a virtual port of the other VD that the user device belongs to through searching a routing table and ARP learning, and to determine a port number of the virtual port of the other VD that the user device belongs to according to the port information of the virtual ports advertised by the other VDs, transmits the packet to the virtual port of the other VD that the user device belongs to according to the IP address, the MAC address and the port number, and receives on the virtual port of the current VD a packet transmitted by another VD and forward the packet to a destination user device within the current VD.

Figure 4:
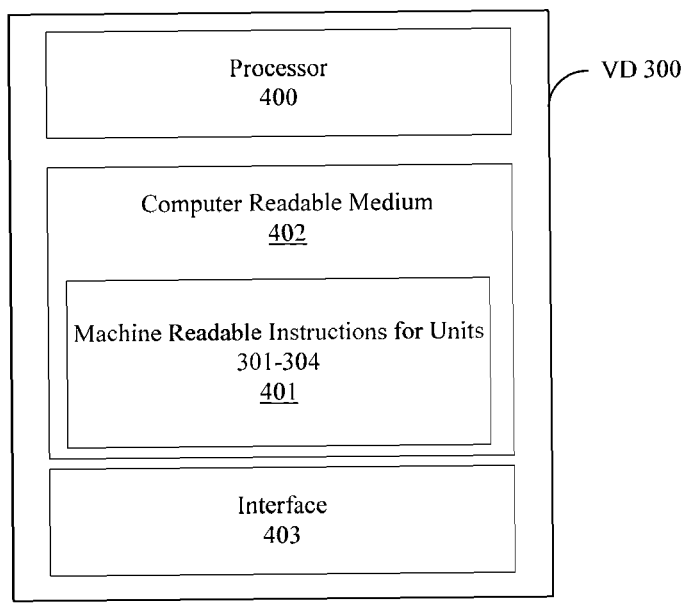
FIG. 4 is a schematic diagram illustrating hardware and machine readable instructions in a VD according to an example of the present disclosure.

The units may be implemented by software (e.g. machine readable instructions stored in a non-transitory computer readable medium, such as memory, and executable by a processor), hardware (e.g. the processor of an ASIC), or a combination thereof. FIG. 4 shows hardware that may be in the VD 300. The units 301-304 may be machine readable instructions 401 stored in a non-transitory computer readable medium 402 that are executable by the processor 400 to perform the functions of the unites 301-304. An interface 403 may include ports or other interfaces connected to a communication channel.

In the VD 300, the virtual port is a loopback port.

When the virtual port is configured for the current VD (e.g., VD 300) to interconnect with other VDs, the configuring unit 301 configures for the current VD a loopback port as the virtual port of the current VD. Or, if some or all of the forwarding chips of the current VD have loopback ports, the configuring unit 301 selects the loopback port of one forwarding chip as the virtual port of the current VD. Or, if some or all of the forwarding chips of the current VD have loopback ports, the configuring unit 301 configures the loopback ports of the forwarding chips to be an aggregated port and configures the aggregated port as the virtual port of the current VD.

In the VD 300, when the virtual port is configured to be the layer-3 port of the current VD to other VDs, the configuring unit 301 configures the virtual port as a router port through allocating an IP address for the virtual port. Or, the configuring unit 301 configures the virtual port as a switch port through adding the virtual port into a pre-defined VLAN corresponding to the current VD and allocating for the virtual port an IP address based on the pre-defined VLAN.

After configuring the virtual port of the current VD to be the layer-3 port to the other VDs, the configuring unit 301 further configures a MAC address for the virtual port.

When the routing information of the current VD is distributed, the routing learning unit 302 generates a routing protocol packet carrying the routing information of the current VD utilizing a CPU shared between the current VD and the other VDs, such that the other VDs obtain the routing protocol packet and learn the routing information carried in the routing protocol packet via the shared CPU, wherein the source IP address and the source MAC address of the routing protocol packet are respectively the IP address and the MAC address of the virtual port of the current VD.

When advertising the port information of the virtual port of the current VD to the other VDs, the port advertising unit 303 configures the virtual port information of the current VD as a global variable, or, generates an information advertising packet carrying the virtual port information of the current VD utilizing the shared CPU, such that the other VDs obtain the information advertising packet and save the virtual port information carried in the information advertising packet via the shared CPU.

In the VD 300, when determining the IP address and the MAC address of the virtual port of the other VD that the user device belongs to through searching the routing table and ARP learning, the forwarding unit 304 determines a next hop IP address through searching the routing table, searches for an ARP table item corresponding to the next hop IP address, if the ARP table item is found, determines the MAC address in the ARP table item as the MAC address corresponding to the next hop IP address. Otherwise, the forwarding unit 304 transmits an APR request message whose target IP address is the next hop IP address to each of the other VDs; if an APR response message returned by any other VD is received, the forwarding unit 304 determines the sender MAC address of the ARP response message as the MAC address corresponding to the next hop IP address and creates an ARP table item corresponding to the next hop IP address. The next hop IP address and the MAC address corresponding to the next hop IP address are determined as the IP address and MAC address of the virtual port of the other VD that the destination user device of the packet belongs to.

The forwarding unit 304 further receives an APR request message transmitted by another VD, if the target IP address of the ARP request message is the IP address of the virtual port of the current VD, returns an ARP response message whose sender IP address and sender MAC address are respectively the IP address and MAC address of the virtual port of the current VD.

In the VD 300, when transmitting the ARP request message with the target IP address of the next hop IP address to the other VDs, the forwarding unit 304 generates the ARP request message with the target IP address of the next hop IP address utilizing the shared CPU, such that the other VD obtains via the shared CPU the ARP request message and generates an ARP response message if the target IP address of the ARP request message is the IP address of the virtual port of this other VD, wherein the sender IP address and the sender MAC address of the ARP response message are respectively the IP address and the MAC address of the virtual port of this other VD.

When returning the ARP response message whose sender IP address and MAC address are respectively the IP address and the MAC address of the virtual port of the current VD after receiving the ARP request message with the target IP address of the IP address of the virtual port of the current VD, the forwarding unit 304 generates utilizing the shared CPU the ARP response message whose sender IP address and sender MAC address are respectively the IP address and the MAC address of the virtual port of the current VD, such that the VD transmitting the ARP request message obtains the ARP response message and determines that the MAC address corresponding to the target IP address of the ARP request message is the sender MAC address of the ARP response message.

The above examples may be implemented by hardware, software, firmware, or a combination thereof. For example the various methods, processes and functional modules described herein may be implemented by a processor (the term processor is to be interpreted broadly to include a CPU, processing module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. Further, the examples disclosed herein may be implemented in the form of a software product. The computer software product is stored in a non-transitory storage medium and comprises a plurality of instructions for making a computer device (which may be a personal computer, a server or a network device, such as a router, switch, access point, etc.) implement the method recited in the examples of the present disclosure.

The drawings in the examples of the present disclosure are some examples. It should be noted that some units and functions of the procedure are not necessarily essential for implementing the present disclosure. The units may be combined into one unit or further divided into multiple sub-units.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A network routing device coupled to a fabric network, comprising:
   a first forwarding chip joined to a first Virtual Device (VD) which includes a first virtual port that corresponds to a loopback port of the first forwarding chip;
   a second forwarding chip joined to a second VD which includes a second virtual port that corresponds to a loopback port of the second forwarding chip,
   a processor coupled to the first forwarding chip and the second forwarding chip to:
      generate a first packet including first routing information of the second VD;
      distribute, to the first VD, the first packet; and
      based on the first routing information, generate a first routing table corresponding to the first VD.

2. The device of claim 1, wherein the first forwarding chip receives, at a user port corresponding to a first user device of the first VD, a second packet addressed to a second user device of the second VD.

3. The device of claim 2, wherein the first forwarding chip transmits, based on the first routing table, the second packet to the second virtual port of the second VD.

4. The device of claim 3, wherein the second forwarding chip forwards the second packet to a third virtual port of the second VD corresponding to the second user device of the second VD.

5. The device of claim 1, wherein the processor is further to:
   generate a third packet including second routing information of the first VD;
   distribute, to the second VD, the third packet; and
   based on the second routing information, generate a second routing table corresponding to the second VD.

6. The device of claim 1, further comprising a third forwarding chip coupled to the processor,
   wherein the first forwarding chip receives, at the loopback port corresponding to the first virtual port, a fourth packet addressed to third user device of the first VD; and
   wherein the first forwarding chip forwards, based on the first routing table, the fourth packet through a fourth virtual port of the first VD, the fifth virtual port corresponding to a user port of the third forwarding chip.

7. The device of claim 6, wherein the fourth packet originates from a user device of the second VD.

8. A method for routing packets, comprising:
   generating, by a processor of a routing device, a first packet addressed to a first virtual port of a first Virtual Device (VD), the first packet including first routing information of a second VD;
   distributing, from the processor to a first user port of a first forwarding chip of the routing device, the first packet, wherein the first user port corresponds to the first virtual port of the first VD;
   based on the first routing information, generating a first routing table corresponding to the first VD;
   receiving, at a second user port of the first forwarding chip corresponding to a first user device of the first VD, a second packet addressed to a second user device of the second VD; and
   transmitting, based on the first routing table, the second packet to a third user port of a second forwarding chip of the routing device, wherein the third user port corresponds to a second virtual port of the second VD.

9. The method of claim 8, further comprising:
   forwarding the second packet to a fourth user port of the device, the fourth user port corresponding to the second user device of the second VD.

10. The method of claim 8, further comprising:
    generating, by a processor of a routing device, a third packet addressed to the second virtual port of the second VD, the third packet including second routing information of the first VD;
    distributing, from the processor to the third user port of the second forwarding chip of the routing device, the third packet, wherein the third user port corresponds to the second virtual port of the second VD;
    based on the second routing information, generating a second routing table corresponding to the second VD;
    receiving, at a fifth user port of the second forwarding chip of the routing device, a fourth packet addressed to a third user device of the first VD;
    based on the second routing table, transmitting the fourth packet to the first user port of the first forwarding chip of the routing device, the first user port corresponding to the first virtual port of the first VD.

11. The method of claim 10, further comprising:
    forwarding the fourth packet to a third virtual port of the first VD, the third virtual port corresponding to the third user device of the first VD.

12. The method of claim 11, wherein the third virtual port corresponds to a sixth user port of a third forwarding chip of the routing device.

13. The method of claim 12, wherein the first user port, the third user port, and the sixth user port are loopback ports for the first forwarding chip, the second forwarding chip, and the third forwarding chip, respectively.

14. The method of claim 12, wherein the first forwarding chip, the second forwarding chip, and the third forwarding chip are communicatively interconnected within the routing device.

15. A system for network routing comprising:
    a first user device;
    a second user device;
    a network routing device coupled to the first user device and the second user device, the network routing device comprising:

a first forwarding chip joined to a first Virtual Device (VD), a second forwarding chip joined to a second VD, and a processor coupled to the first forwarding chip and the second forwarding chip to:
- generate a first packet including first routing information of the second VD;
- distribute, to a first virtual port of the first VD, the first packet, wherein the first virtual port corresponds to a loopback port of the first forwarding chip;
- based on the first routing information, generate a first routing table corresponding to the first VD;
- generate a second packet including second routing information of the first VD; and
- distribute, to a second virtual port of the second VD, the second packet, wherein the second virtual port corresponds to a loopback port of the second forwarding chip.

16. The system of claim 15, wherein the first forwarding chip receives, at a user port corresponding to the first user device, a third packet addressed to the second user device.

17. The system of claim 16, wherein the first forwarding chip transmits, based on the first routing table, the third packet to the second virtual port of the second VD.

18. The system of claim 17, wherein the second forwarding chip forwards the third packet to a third virtual port of the second VD corresponding to the second user device.

19. The system of claim 15, wherein the second forwarding chip receives, at the third virtual port corresponding to the second user device, a fourth packet addressed to a third user device, and
   wherein the second forwarding chip transmits, based on the second routing table, the fourth packet to the first virtual port of the first VD.

20. The system of claim 19, wherein the first forwarding chip forwards the fourth packet to a fourth virtual port of the first VD corresponding to the third user device, and wherein the fourth virtual port corresponds to a user port of a third forwarding chip.

* * * * *